US009575743B1

(12) United States Patent
Chun

(10) Patent No.: US 9,575,743 B1
(45) Date of Patent: Feb. 21, 2017

(54) APPARATUS FOR UPDATING SOFTWARE OF VEHICLE TERMINAL AND SOFTWARE PROVIDING SERVER

(71) Applicant: Hyundai Motor Company, Seoul (KR)

(72) Inventor: Chang Woo Chun, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 2 days.

(21) Appl. No.: 14/949,244

(22) Filed: Nov. 23, 2015

(30) Foreign Application Priority Data

Sep. 21, 2015 (KR) ........................ 10-2015-0133344

(51) Int. Cl.
*H04L 29/08* (2006.01)
*F02N 11/08* (2006.01)
*B60L 11/18* (2006.01)
*G06F 9/445* (2006.01)

(52) U.S. Cl.
CPC .............. *G06F 8/65* (2013.01); *B60L 11/1861* (2013.01); *F02N 11/0862* (2013.01); *H04L 67/10* (2013.01); *H04L 67/12* (2013.01); *H04L 67/34* (2013.01)

(58) Field of Classification Search
None
See application file for complete search history.

(56) References Cited

U.S. PATENT DOCUMENTS

| 9,141,370 B1* | 9/2015 | Nay ........................... G06F 8/65 |
| 2009/0100417 A1* | 4/2009 | Bolanowski ............. G06F 8/67 717/168 |
| 2009/0300595 A1* | 12/2009 | Moran ....................... G06F 8/65 717/170 |

(Continued)

FOREIGN PATENT DOCUMENTS

KR 1998-0073190 11/1998
KR 10-2006-0085239 A 7/2006

(Continued)

OTHER PUBLICATIONS

Miucic. R et al. An In-Vehicle Distributed Technique for Remote Programming of Vehicles' Embedded Software. No. 2005-01-0313. SAE Technical Paper, 2005, Retrieved on [Dec. 6, 2016] Retrieved from the Internet:URL<http://papers.sae.org/2005-01-0313/>.*

(Continued)

*Primary Examiner* — Thuy Dao
*Assistant Examiner* — Cheneca Smith
(74) *Attorney, Agent, or Firm* — Mintz Levin Cohn Ferris Glovsky and Popeo, P.C.; Peter F. Corless

(57) ABSTRACT

An apparatus for updating software of a vehicle terminal includes: a software information storage unit receiving latest version software information transmitted from a software providing server; an update controller receiving a software update request of a vehicle terminal transmitted from the software providing server and performing a software download and update; a battery charging determiner checking a state of charge of a battery installed in a vehicle and comparing the state of charge of the battery with an estimated battery consumption among the latest version software information; and an engine driver driving an engine of the vehicle when the state of charge of the battery is less than the estimated battery consumption.

5 Claims, 3 Drawing Sheets

(56) References Cited

U.S. PATENT DOCUMENTS

| | | | | |
|---|---|---|---|---|
| 2014/0173579 A1* | 6/2014 | McDonald | ............... | G06F 8/65 717/170 |
| 2015/0113521 A1* | 4/2015 | Suzuki | ..................... | G06F 8/65 717/173 |
| 2015/0277890 A1* | 10/2015 | Throop | .................... | G06F 8/65 717/172 |

FOREIGN PATENT DOCUMENTS

| KR | 2011-0063056 A | 6/2011 |
|---|---|---|
| KR | 2012-0019870 A | 3/2012 |
| KR | 10-2013-0036794 A | 4/2013 |

OTHER PUBLICATIONS

Xing, Yinjiao, et al. "Battery management systems in electric and hybrid vehicles." Energies 4.11 (2011): 1840-1857. Retrieved on [Dec. 6, 2016] Retrieved from the Internet: URL< http://www.mdpi.com/1996-1073/4/11/1840/htm>.*

* cited by examiner

APPARATUS FOR UPDATING SOFTWARE OF VEHICLE TERMINAL AND SOFTWARE PROVIDING SERVER

CROSS-REFERENCE TO RELATED APPLICATION

This application claims priority to and the benefit of Korean Patent Application No. 10-2015-0133344 filed in the Korean Intellectual Property Office on Sep. 21, 2015, wherein the entire contents of which are incorporated herein by reference.

BACKGROUND OF THE DISCLOSURE (a) Technical Field

The present disclosure relates generally to an apparatus for updating software of a vehicle terminal and a software providing server, and more particularly, to an apparatus for updating software of a vehicle terminal and a software providing server capable of updating software of a vehicle terminal into a latest version when latest version software of the vehicle terminal is released and preventing a vehicle battery from being discharged while the software is updated.

(b) Description of the Related Art

An engine control unit (hereinafter, referred to as "ECU"), a telematics unit, and a navigation unit in a vehicle are examples of vehicle devices which can provide a control function and/or a convenience function based on software stored in a microprocessor. The ECU, the telematics unit, and the navigation unit can store software of a version corresponding to the release of the vehicle. Car makers produce and distribute software of a subsequent version for the purpose of correcting bugs, improving performance of the existing function, adding a new function, etc., after the vehicle is released.

As defects disrupting safe driving of the vehicle frequently occur due to errors of ECU software in recent years, software updates have been recognized as a very important factor in maintaining safe driving of the vehicle. However, since software updates of a vehicle terminal are mainly performed in service centers designated by car makers, vehicle drivers suffer the inconvenience of having to frequently visit the service centers. Further, even when the vehicle driver directly downloads the latest version software update online to do the software update of the vehicle terminal, the driver must wait extended times until the software update is completed.

The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

The present disclosure has been made in an effort to provide an apparatus for updating software of a vehicle terminal and a software providing server having advantages of updating software of a vehicle terminal to a latest version.

Embodiments of the present disclosure provide an apparatus for updating software of a vehicle terminal, including: a software information storage unit receiving latest version software information transmitted from a software providing server; an update controller receiving a software update request of a vehicle terminal transmitted from the software providing server and performing a software download and update; a battery charging determiner checking a state of charge of a battery installed in a vehicle and comparing the state of charge of the battery with an estimated battery consumption among the latest version software information; and an engine driver driving an engine of the vehicle when the state of charge of the battery is less than the estimated battery consumption.

The apparatus may further include: a fuel level checker checking a fuel level of the vehicle and comparing the checked fuel level with an estimated fuel consumption among the latest version software information when the state of charge of the battery is less than the estimated battery consumption. The engine driver may drive the engine of the vehicle when the fuel level is greater than or equal to the estimated fuel consumption.

The engine driver may stop driving the engine when the state of charge of the battery is greater than or equal to the estimated battery consumption while the software is being downloaded and updated.

The apparatus may further include: a first download and update information transmitter transmitting the software download and update information to the software providing server.

The software providing server may receive the software download and update information and transmit the received software download and update information to a driver terminal of the vehicle.

The latest version software information may include at least one of: a latest software version, a latest version release date, an applied vehicle model, modified and additional function related information, an applied terminal, a download file capacity, a download estimation time, an estimated update time, an estimated battery consumption when the download and update is performed, an estimated fuel consumption when the download and update is performed, and a software update file.

Furthermore, according to embodiments of the present disclosure provide a software providing server, including: a software information storage unit receiving and storing latest version software information transmitted from a vehicle maker of a vehicle or a vehicle terminal manufacturer; and a software information transmitter transmitting the received latest version software information to a driver terminal.

The software providing server may further include: a driver request receiver receiving a software update request of the vehicle terminal installed in the vehicle transmitted from the driver terminal.

The software providing server may further include: a software version information receiver receiving first software version information of the vehicle terminal transmitted from an apparatus for updating software of the vehicle terminal; and an update determiner determining whether to update the software of the vehicle terminal based on a comparison of the received first software version information with second software version information among the latest version software information.

The software information transmitter may transmit the latest version software information to the apparatus for updating software of the vehicle terminal when the first software version information is different from the second software version information.

The latest version software information may include at least one of: a latest software version, a latest version release date, an applied vehicle model, modified and additional function related information, an applied terminal, a download file capacity, a download estimation time, an estimated update time, an estimated battery consumption when the download and update is performed, an estimated fuel consumption when the download and update is performed, and a software update file.

Accordingly, it is possible to provide the new version software release information to the ECU, the telematics unit, and the navigation unit to the vehicle driver and provide information about the software download progression rate, the update progression rate, and whether the update succeeds. Furthermore, it is possible to stably perform the software update of the ECU, the telematics unit, and the navigation unit of the vehicle.

DESCRIPTION OF SYMBOLS

Figure 1:
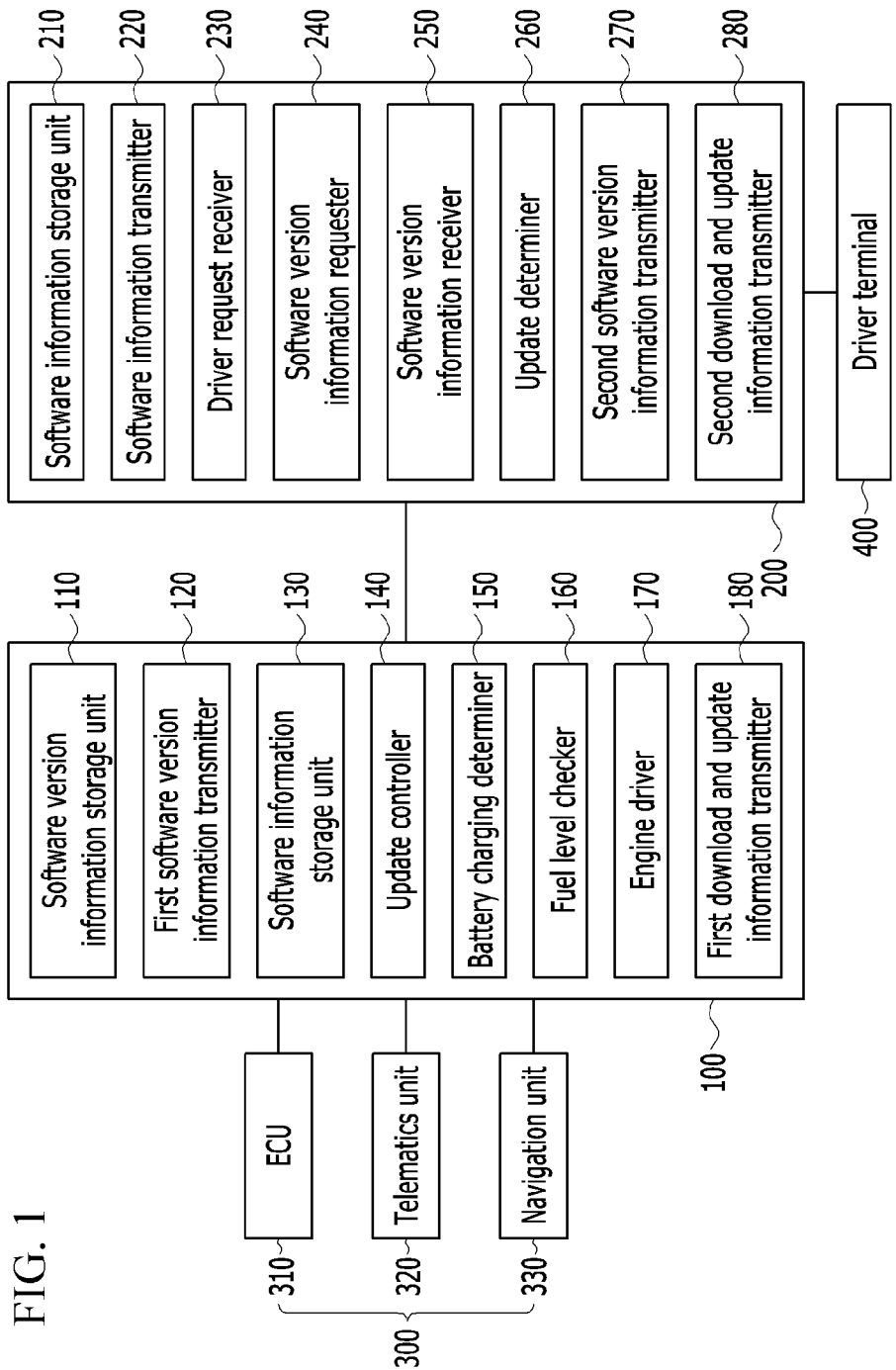
FIG. 1 is a diagram illustrating a configuration of an apparatus for updating software of a vehicle terminal and a software providing server according to embodiments of the present disclosure.

100: Software update apparatus 110: Software version information storage unit
120: First software version information transmitter 130: Software information storage unit
140: Update controller 150: Battery charging determiner
160: Fuel level checker 170: Engine driver
180: First download and update information transmitter
200: software providing server 210: software information storage unit
220: Software information transmitter 230: Driver request receiving unit
240: Software version information requester 250: software version information receiver
260: Update determiner
270: Second software version information transmitter
300: Vehicle terminal 310: Engine control unit (ECU)
320: Telematics unit 330: Navigation unit
400: Driver terminal

DETAILED DESCRIPTION OF THE EMBODIMENTS

Hereinafter, embodiments of the present disclosure so as to be easily practiced by a person skilled in the art to which the present disclosure pertains will be described in detail with reference to the accompanying drawings. As those skilled in the art would realize, the described embodiments may be modified in various different ways, all without departing from the spirit or scope of the present disclosure. In order to clearly describe the present disclosure, portions that are not connected with the description will be omitted. Like reference numerals designate like elements throughout the specification. In addition, the detailed description of the widely known technologies will be omitted.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

In the present specification, a 'version' means a number representing how many software is revised. For example, when the software is first released, the version is 1.0 and when the existing additional functions is supplemented or new functions are added, the version may be represented by 2.0, 3.0, etc.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

FIG. 1 is a diagram illustrating a configuration of an apparatus for updating software of a vehicle terminal and a software providing server according to embodiments of the present disclosure.

As shown in FIG. 1, an apparatus 100 for updating software of a vehicle terminal (hereinafter, referred to as "update apparatus") is installed in the vehicle and is connected to a software providing server 200 through a wireless communication network. Further, the update apparatus 100 is connected to a vehicle terminal 300 through a wired communication network or a wireless communication network.

The software providing server 200 is connected to a driver terminal 400 through the wireless communication network. In this case, the driver terminal 400 means a portable terminal of a driver providing data communications. For example, the driver terminal 400 includes a cellular phone, a personal digital assistant (PDA), a smart phone, or a wearable device.

The vehicle terminal 300 may include an engine control unit (ECU) 310, a telematics unit 320, and a navigation unit 330.

The update apparatus 100 updates software of the vehicle terminal 300 equipped in the vehicle and may include a software version information storage unit 110, a first software version information transmitter 120, a software basic information storage unit 130, an update controller 140, a battery charging determiner 150, a fuel level checker 160, an engine driver 170, and a first download and update information transmitter 180.

The software version information storage unit 110 stores latest update date and software version information of the vehicle terminal 300.

The first software version information transmitter 120 receives a software version information transmission request transmitted from the software providing server 200 and transmits the software version information of the vehicle terminal 300 stored in the software version information storage unit 110 to the software providing server 200.

The software basic information storage unit 130 receives and stores software basic information transmitted from the software providing server 200. The software basic information includes a terminal to which the latest software is applied, download file capacity, estimated download time, estimated update time, estimated battery consumption when download and update are performed (hereinafter, referred to as "estimated battery consumption"), and estimated fuel consumption when download and update are performed (hereinafter, referred to as "estimated fuel consumption").

When the software basic information is received, the update controller 140 performs a software file download and update of the vehicle terminal 300 based on the software basic information.

The battery charging determiner 150 checks a state of charge of a battery and determines whether to charge the battery based on a comparison of the checked state of charge of the battery with the estimated battery consumption among the software basic information stored in the software basic information storage unit 130. If the battery charging determiner 150 determines that the battery needs to be charged, the fuel level checker 160 checks the fuel level of the vehicle and determines whether to charge the battery based on the comparison of the checked fuel level with the estimated fuel consumption among the software basic information stored in the software basic information storage unit 130.

The engine driver 170 drives the engine if the fuel level checker 160 determines that the battery may be charged.

The first download and update information transmitter 180 performs a software update completion check of the vehicle terminal 300 and transmits a download progression rate, whether the download succeeds, an update progression rate, or whether the update succeeds to the software providing server 200 based on the checked result.

The software providing server 200 may include a software information storage unit 210, a software information transmitter 220, a driver request receiver 230, a software version information requester 240, a software version information receiver 250, an update determiner 260, a second software version information transmitter 270, and a second download and update information transmitter 280.

The software information storage unit 210 stores latest version software information provided from car makers or vehicle terminal manufacturers. The software information includes registration information including a latest software version, a latest version release date, an applied vehicle model, and modified and additional function related information, basic information including an applied terminal, download file capacity, estimated download time, estimated update time, estimated battery consumption, and estimated fuel consumption, and a software update file.

The software information transmitter 220 transmits the software registration information stored in the software information storage unit 210 to the driver terminal 400. Further, the software information transmitter 220 transmits the software basic information stored in the software information storage unit 210 to the update apparatus 100.

The driver request receiver 230 receives a software update request or a software information request of the vehicle terminal 300 transmitted from the driver terminal 400.

When the software update request or the software information request of the vehicle terminal is received through the update request receiver 230, the software version information requester 240 requests the software version information of the vehicle terminal 300 to the update apparatus 100.

The software version information receiver 250 receives the software version information of the vehicle terminal 300 transmitted from the update apparatus 100.

The update determiner 260 determines whether the update is required by comparing the software version information of the vehicle terminal 300 received through the software version information receiver 250 with the latest software version information among the software registration information. If the update determiner 260 determines that the software of the vehicle terminal 300 needs to be updated, the software basic information stored in the software information storage unit 210 is transmitted to the update apparatus 100 through the software information transmitter 220.

The second software version information transmitter 270 transmits the software version information of the vehicle terminal 300 received through the software version information receiver 250 to the driver terminal 400.

The second download and update information transmitter 280 transmits the download information or the update information transmitted from the first download and update information transmitter 180 to the driver terminal 400.

Figure 2:
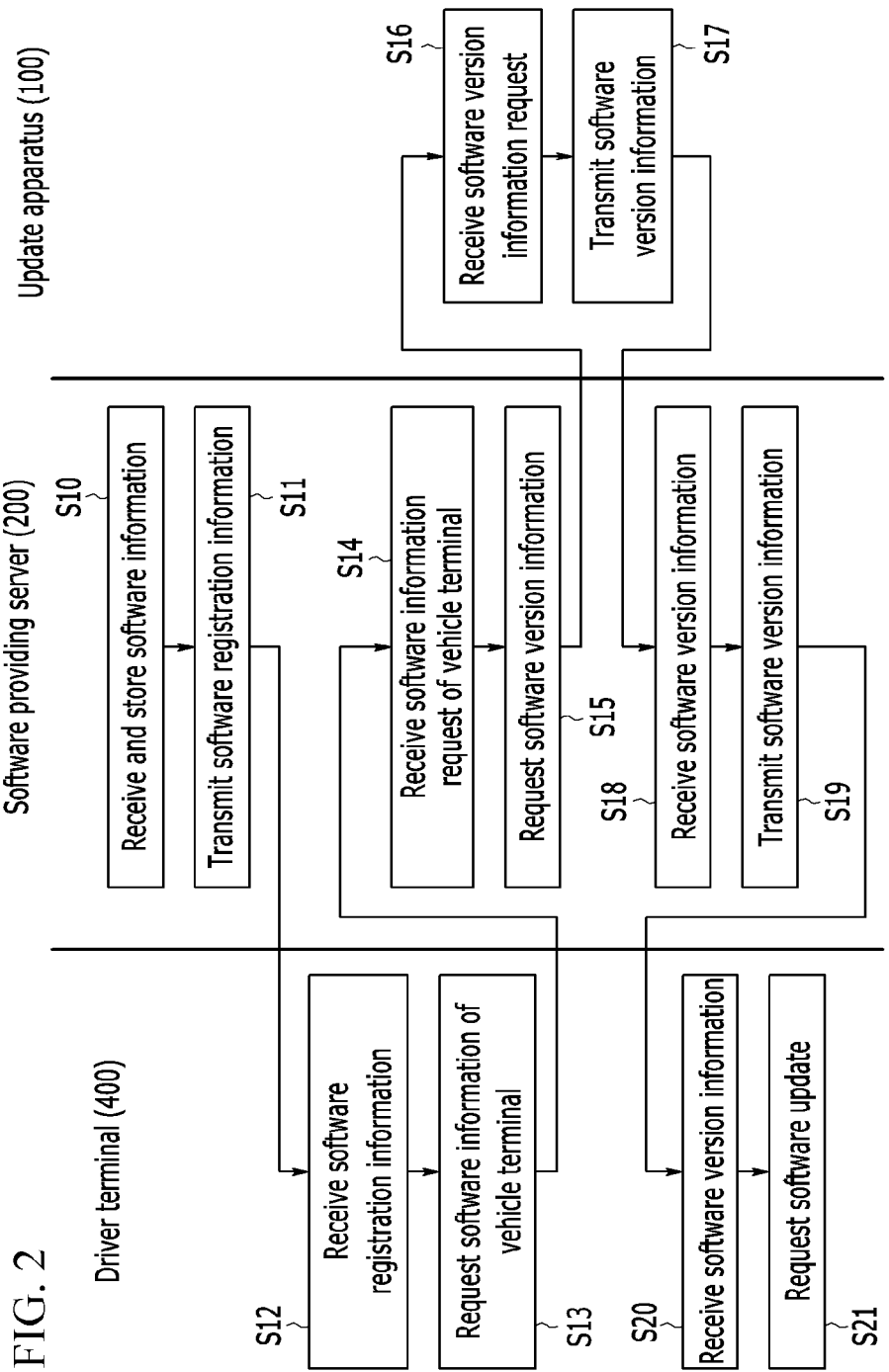
FIG. 2 is a diagram illustrating a method for providing software registration information using the apparatus for updating software of FIG. 1.

FIG. 2 is a diagram illustrating a method for providing software registration information using the apparatus for updating software of FIG. 1.

First, the software providing server 200 stores the software registration information and the software basic information provided from the vehicle makers or the vehicle terminal manufacturers through the software information storage unit 210.

Next, the software providing server 200 transmits the stored software registration information to the driver terminal 400 through the software registration information transmitter 220 (S11). The software providing server 200 may transmit software registration information in a form of an e-mail, a text message, or a push message.

The driver terminal 400 receives the software registration information (S12) and transmits the software information request of the vehicle terminal 300 to the software providing server 200 (S13).

The software providing server 200 receives the software information request through the driver request receiver 230 (S14) and transmits the software version information request to the update apparatus 100 through the software version information requester 240 (S15).

The update apparatus 100 receives the software version information request through the first software version information transmitter 120 (S16) and transmits the software version information of the vehicle terminal 300 stored in the software version information storage unit 110 to the software providing server 200 (S17).

The software providing server 200 receives the software version information through the software version information receiver 250 (S18) and transmits the software version information to the driver terminal 400 through the second software version information transmitter 270 (S19).

The driver terminal 400 receives the software version information (S20) and transmits the software update request to the software providing server 200 (S21).

Figure 3:
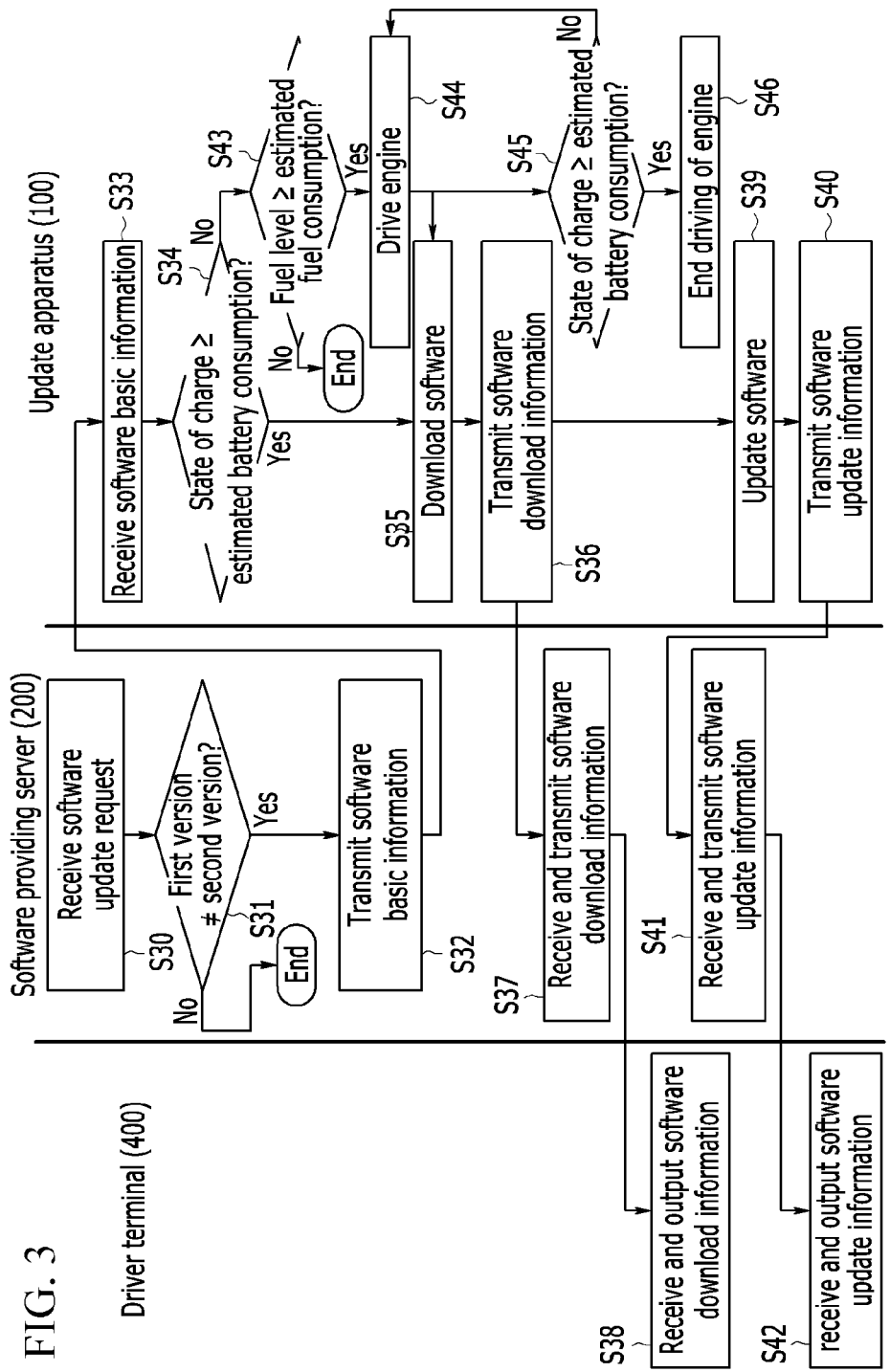
FIG. 3 is a diagram illustrating a method for updating software using the apparatus for updating software of FIG. 1.

FIG. 3 is a diagram illustrating a method for updating software using the apparatus for updating software of FIG. 1.

The software providing server 200 receives the software update request transmitted in step S21 of FIG. 2 through the driver request receiver 230 (S30).

Next, the update determiner 260 compares the latest software version information (i.e., first version) among the software registration information stored in step S10 with the software version information (i.e., second version) received in step S18 (S31).

As the comparison result of step S31, if the first version is different from the second version, it is determined that the software update of the vehicle terminal 300 is required to transmit the software basic information stored in the software information storage unit 210 to the update apparatus 100. As the comparison result of step S31, if the first version is the same as the second version, it is determined that the software update of the vehicle terminal 300 is not required to end the software update.

The update apparatus 100 receives and stores the software basic information transmitted in step S32 through the software basic information storage unit 130 (S33).

Next, the state of charge of the battery is compared with the estimated battery consumption among the software basic information received in step S33 (S34).

As the comparison result of step S34, if the state of charge of the battery is equal to or greater than the estimated battery consumption, it is determined that the software may be downloaded and updated and the update controller 140 performs the download of the software update file stored in the software information storage unit 210 (S35) and transmits the download information of step S35 to the software providing server 200 through the first download and update information transmitter 180 (S36). In this case, the download information includes the information on the download progression rate or whether the download is completed.

The software providing server 200 receives the download information transmitted in step S36 through the second download and update information transmitter 180 and transmits the received download information to the driver terminal 400 (S37).

The driver terminal 400 receives and outputs the download information transmitted in step S37 (S38).

When the download in step S35 is completed, the update apparatus 100 performs the software update through the update controller 140 (S39) and transmits the update information of step S39 to the software providing server 200 through the first download and update information transmitter 180 (S40). In this case, the update information includes the information on the update progression rate or whether the update is completed.

The software providing server 200 receives the update information transmitted in step S40 through the second download and update information transmitter 180 and transmits the received update information to the driver terminal 400 (S41).

The driver terminal 400 receives and outputs the update information transmitted in step S41 (S42).

As the comparison result of step S34, if the state of charge of the battery is less than the estimated battery consumption, it is determined that the software download and update may not made and the fuel level of the vehicle is compared with the estimated fuel consumption among the software basic information received in step S33 (S43).

As the comparison result of step S43, if the fuel level is equal to or greater than the estimated fuel consumption, the engine driver 170 drives the engine of the vehicle to charge the battery (S44). As the comparison result of step S43, if the fuel level is less than the estimated fuel consumption, it is determined that the software update of the vehicle terminal 300 may not be made and thus the software update ends.

Next, the state of charge of the battery is compared with the estimated battery consumption while the battery is charged in S44 (S45).

As the comparison result of step S45, if the state of charge of the battery is equal to or greater than the estimated battery consumption, it is determined that the software download and update may be made and the engine driver 170 ends the driving of the engine (S46).

According to embodiments of the present disclosure, the new software information and the software update of the vehicle terminal transmitted from the car makers or the vehicle terminal manufacturers and the software download information and the software update information transmitted from the update apparatus may be provided to the driver. Further, the driver may use the driver terminal to perform the software update of the vehicle terminal remotely.

Additionally, according to embodiments of the present disclosure, it is determined whether the engine of the vehicle is driven depending on the battery and the fuel state of the vehicle to perform the software download and update of the vehicle terminal, thereby preventing the software file download and update from stopping due to the discharge or fuel shortage of the battery. Further, as the result of checking the state of charge of the battery of the vehicle while the software download and update of the vehicle terminal is performed, the driving of the engine of the vehicle is controlled to reduce the fuel consumption.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. An apparatus for updating software of a vehicle terminal, comprising:
   a software information storage unit receiving latest version software information transmitted from a software providing server;
   an update controller receiving a software update request of the vehicle terminal transmitted from the software providing server and performing a software download and update;
   a battery charging determiner checking a state of charge of a battery installed in a vehicle and comparing the state of charge of the battery with an estimated battery consumption among the latest version software information;
   a fuel level checker checking a fuel level of the vehicle and comparing the checked fuel level with an estimated fuel consumption among the latest version software information when the state of charge of the battery is less than the estimated battery consumption; and
   an engine driver driving an engine of the vehicle when the state of charge of the battery is less than the estimated battery consumption and the fuel level is greater than or equal to the estimated fuel consumption and, after driving the engine for a period of time, ending the driving of the engine when the state of charge of the battery is greater than or equal to the estimated battery consumption, wherein the update controller performs the software download and update when the state of charge of the battery is greater than or equal to the estimated battery consumption.

2. The apparatus of claim 1, wherein:

the engine driver stops driving the engine when the state of charge of the battery is greater than or equal to the estimated battery consumption while the software is being downloaded and updated.

3. The apparatus of claim 1, further comprising:

a first download and update information transmitter transmitting software download and update information to the software providing server.

4. The apparatus of claim 3, wherein:

the software providing server receives the software download and update information and transmits the received software download and update information to a driver terminal of the vehicle.

5. The apparatus of claim 1, wherein:

the latest version software information includes at least one of: a latest software version, a latest version release date, an applied vehicle model, modified and additional function related information, an applied terminal, a download file capacity, a download estimation time, an estimated update time, an estimated battery consumption when the download and update is performed, an estimated fuel consumption when the download and update is performed, and a software update file.

* * * * *